(12) United States Patent  
Cohen

(10) Patent No.: US 8,979,624 B2  
(45) Date of Patent: Mar. 17, 2015

(54) MULTIPLE USER INTERACTIVE INTERFACE

(76) Inventor: Robert H. Cohen, West Hollywood, CA (US)

( * ) Notice: Subject to any disclaimer, the term of this patent is extended or adjusted under 35 U.S.C. 154(b) by 216 days.

(21) Appl. No.: 12/868,057

(22) Filed: Aug. 25, 2010

(65) Prior Publication Data

US 2011/0053689 A1    Mar. 3, 2011

Related U.S. Application Data

(60) Provisional application No. 61/237,685, filed on Aug. 28, 2009.

(51) Int. Cl.
*A63F 9/24*    (2006.01)
*H04N 21/475*    (2011.01)
*H04L 12/18*    (2006.01)
*H04N 21/25*    (2011.01)

(52) U.S. Cl.
CPC .......... *H04N 21/475* (2013.01); *H04L 12/1818* (2013.01); *H04L 12/185* (2013.01); *H04N 21/252* (2013.01)
USPC ................................................ 463/9; 463/42

(58) Field of Classification Search
USPC ....................................................... 463/42, 9
See application file for complete search history.

(56) References Cited

U.S. PATENT DOCUMENTS

| | | | | |
|---|---|---|---|---|
| 5,660,389 A | * | 8/1997 | Freda, III | 273/249 |
| 6,439,997 B1 | * | 8/2002 | Brasseur et al. | 463/40 |
| 2004/0187148 A1 | * | 9/2004 | Cassella | 725/35 |
| 2005/0001903 A1 | * | 1/2005 | Endler et al. | 348/207.1 |
| 2005/0240955 A1 | * | 10/2005 | Hudson | 725/9 |
| 2007/0186230 A1 | * | 8/2007 | Foroutan | 725/24 |
| 2008/0004946 A1 | * | 1/2008 | Schwarz | 705/12 |
| 2008/0045284 A1 | * | 2/2008 | Assaad et al. | 463/9 |
| 2008/0184122 A1 | * | 7/2008 | Grant et al. | 715/723 |
| 2009/0018852 A1 | * | 1/2009 | Victor | 705/1 |
| 2009/0150203 A1 | * | 6/2009 | Baudisch et al. | 705/8 |

* cited by examiner

*Primary Examiner* — Steve Rowland  
(74) *Attorney, Agent, or Firm* — Klein, O'Neill & Singh, LLP

(57) ABSTRACT

A plurality of participants in a conversation may be scored based on ability to correctly answer questions and based on entertainment value as determined by viewers of the conversation. The conversation may be in the form of a game, or may include a number of different substantially simultaneous conversations. Audio data and video data of the conversation may be transmitted over a network, and viewer scores of the participants in the conversation may be received over the network. Participants in future conversation may be selected based on their skill in answering questions and their entertainment value, with different future conversations using different weightings of skill scores and entertainment scores in determining who may participate in the conversation.

2 Claims, 7 Drawing Sheets

MULTIPLE USER INTERACTIVE INTERFACE

CROSS REFERENCE TO RELATED APPLICATIONS

This application claims the benefit of the filing date of U.S. Provisional Application No. 61/237,685, filed Aug. 28, 2009, entitled "Multiple User Interactive Interface," the disclosure of which is incorporated by reference.

BACKGROUND OF THE INVENTION

The present invention relates generally to interactive live multicast communication interfaces, and more particularly to common presentation of multiple conversations.

Television and radio broadcasts have long presented conversations between one or more people. The conversations may be interviews or similar to interviews, or game shows or other activities in which participants interact in an unscripted or semi-scripted manner. The people participating in such interviews or conversations generally are all at the same location, although at times individuals from distant locales may join the conversation by way of electronic communications. Very often the topic of the conversation, the individuals who are to participate in the conversation, the time of the conversation, the time of presentation of the conversation, and the means of presentation are all centrally selected.

Many such conversations are presented by the broadcast media, whether through over-the-air radio or television broadcasts or by way of cable or satellite television. The number of channels available or used, however is limited, limiting the number of available conversations. In addition, even if the number of channels were unlimited, locating engaging conversations by potential viewers may be difficult.

Generally in such conversations, only a single individual speaks at any given time, that is if the conversation is to be followed in a rational manner by viewers. Of course, in some instances several or all participants in the conversation may each speak at the same time, with ever-increasing volume, but in such cases it is generally difficult to follow or understand what the participants are stating. Accordingly, a viewer who is particularly interested in the thoughts of just one of the conversationalists may be unable to hear that particular individual, or that individual may not be provided sufficient time to fully explain their thoughts. Moreover, given the limited number of conversations that may be on any particular broadcast, it may be that, at any given time, the particular conversation being presented is not of particular interest to the viewer.

Further, a viewer may themselves wish to participate in the conversation, but is unlikely to be afforded the opportunity to do so. In addition, there may be a host of situations in which a user may wish to engage in such a conversation in a real-time manner, with visual interaction with other participants in the conversation, but be unable to do so.

BRIEF SUMMARY OF THE INVENTION

Aspects of the invention provide for multiple users interacting with each other over a communication network. In one aspect the invention provides a method using a computer of providing for presentation of a game, comprising: transmitting at least one question over a network to a plurality of participants and a plurality of viewers; receiving audio data and video data over the network from the plurality of participants, the audio and video data including a response to the at least one question from at least one participant; transmitting the audio data and video data over the network to the plurality of viewers; scoring the response to the at least one question from the at least one participant; and receiving over the network a score indicative of entertainment value of the at least one participant from at least some of the plurality of viewers.

In another aspect the invention provides a method using a computer of providing conversation data, comprising: receiving requests over a network from potential participants to participate in a conversation; determining participants in the conversation; formatting a display area for display of the participants; receiving conversation information of the participants over the network; and transmitting the conversation information over the network to the participants and a plurality of viewers, at least some of the conversation information being formatted in accordance with the display area, and transmitting along with the conversation information an indication of source of the conversation information for each participant.

These and other aspects of the invention are more fully comprehended on review of this disclosure.

DETAILED DESCRIPTION

Figure 1:
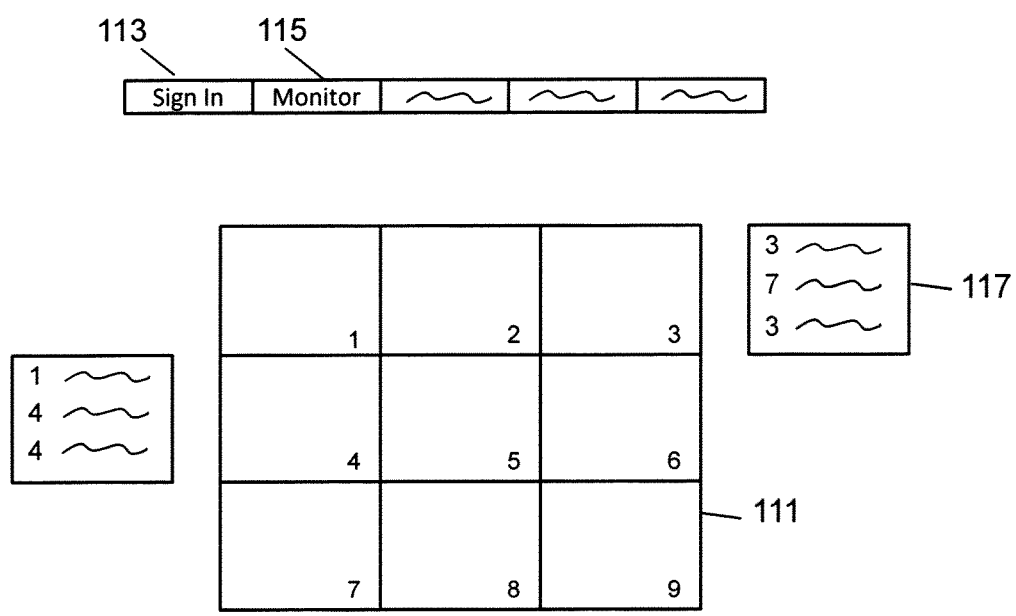
FIG. 1 is an example screen shot layout in accordance with aspects of the invention.

FIG. 1 illustrates a sample screen layout for a conversation in accordance with aspects of the invention. The screen includes a participant display area 111. The participant display area includes boxes for display of participants. In general, video for each of the boxes is separately streamed and collated before common display. For example, a particular participant may have a video camera and a microphone at their location, with video data and audio data transmitted to a central location, where the video data and audio data is collated with video data and audio data of other participants for common presentation. The participant display area includes boxes for each of the participants. In the example of FIG. 1, the participant display area includes nine boxes for nine participants participating in the conversation.

The display area also includes drop-down menus. As illustrated, the drop-down menus includes a sign in drop-down menu 113 and a monitor drop-down menu 115. Selection of the sign in drop-down menu provides options for a user to sign in and become a participant in the conversation. The monitor drop-down menu provides options for a user to monitor particular conversations amongst participants. For example, if participant three is in a conversation with participant seven, and simultaneously participant one is in a conversation with participant four, a user may use the monitor drop-down menu to select audio for only one of those conversations. Similarly, the monitor drop-down menu could be used to select conversations in which only a particular participant is engaging.

In addition, in some embodiments text of a conversation, provided either by way of a speech-to-text converter or in the event the conversation is being conducted by way of text messages, instant messages or similar messaging schemes, is presented by way of a text box. In the embodiment illustrated in FIG. 1, a text box 117 is located approximate participant box 3. As illustrated in FIG. 1, the text box 117 includes text of a conversation between participant three and participant seven, with the text displayed in a scrolling manner. The text box is located approximate participant box three as participant three initiated the conversation with participant seven. Similarly, a text box 119 is located approximate participant box 4. The text box 119 approximate participant box 4 includes text of a conversation between participant 4 and participant one. The location of the text box indicates that participant four initiated a conversation with participant one. The text box also indicates the originator of the text for each line of text.

Accordingly, in the example of FIG. 1, nine participants may engage in one or more conversations, and users may monitor the conversation or conversations as they see fit.

Figure 2:
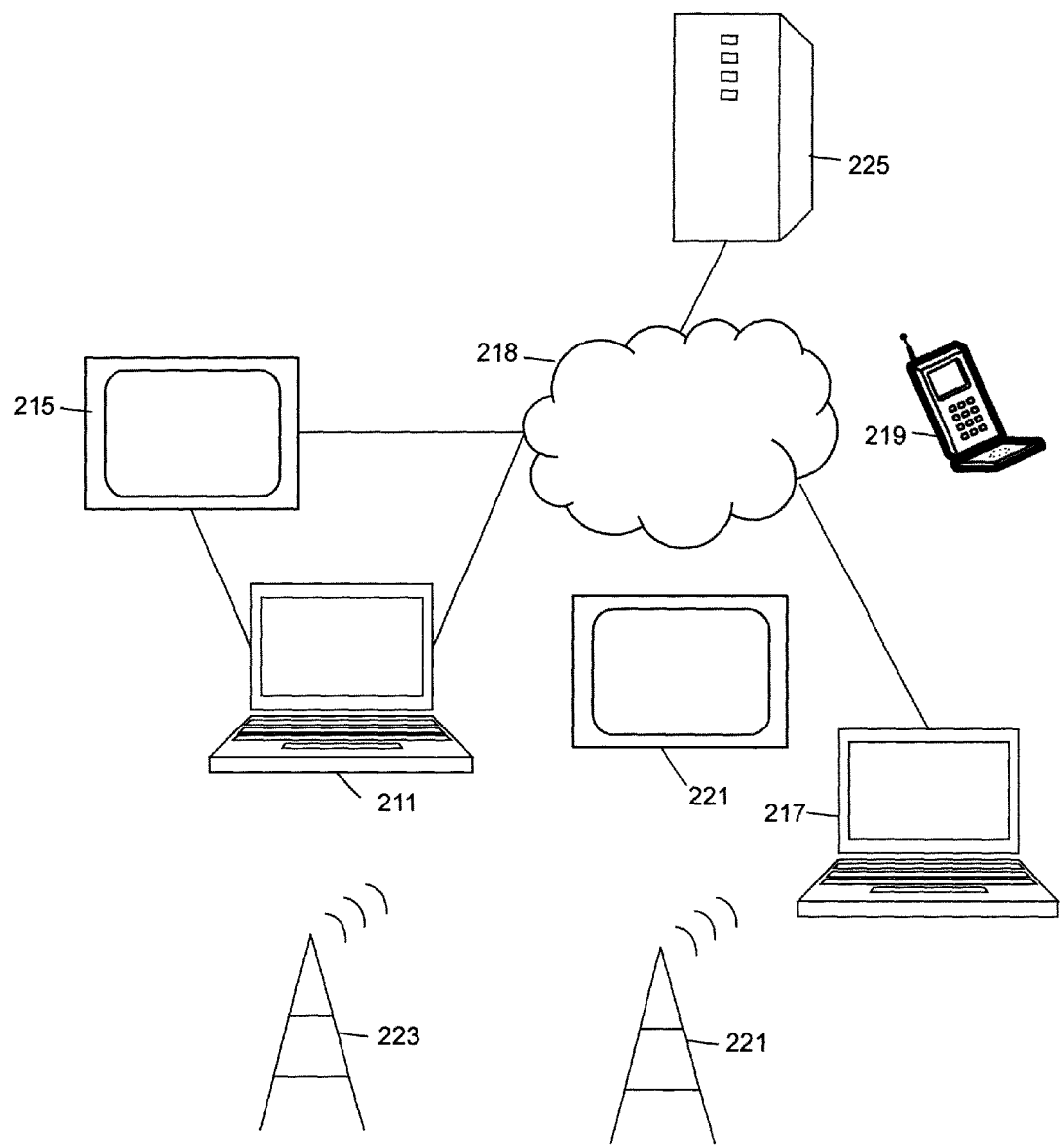
FIG. 2 is a block diagram of a system in accordance with aspects of the invention.

FIG. 2 is a block diagram of a system for use in accordance with aspects of the invention. In FIG. 2 a number of users have user equipment, with the user equipment coupled to a network. For example. a first user may have a computer unit 211 and a television 215, both data coupled together and both data coupled to a network such as the Internet 218. Another user may simply have a computer unit 217. A third user may be using a cellular telephone 219, with the cellular telephone preferably having data capabilities. The cellular telephone is linked by way of wireless communications to a base station 221, which in turn is data coupled to the Internet. A further user may simply receive over-the-air broadcast communications by way of a television 221, with the broadcast communications being transmitted by way of an antenna transmitter 223.

Also coupled to the Internet, as well as to the base station and the broadcast transmitter (by way of connections not shown) is a server 225. The server receives, over the Internet, data from participants. The participants may be for example using the computer unit 217 and the cell phone 219 (with cameras and microphones either in the computer unit and cell phone or separately attached to the computer unit and cell phone), with the computer unit and the cell phone transmitting presentation information, including audio and video data, to the server. The server, in turn, transmits the audio and video data to the users, including the participants.

Figure 3:
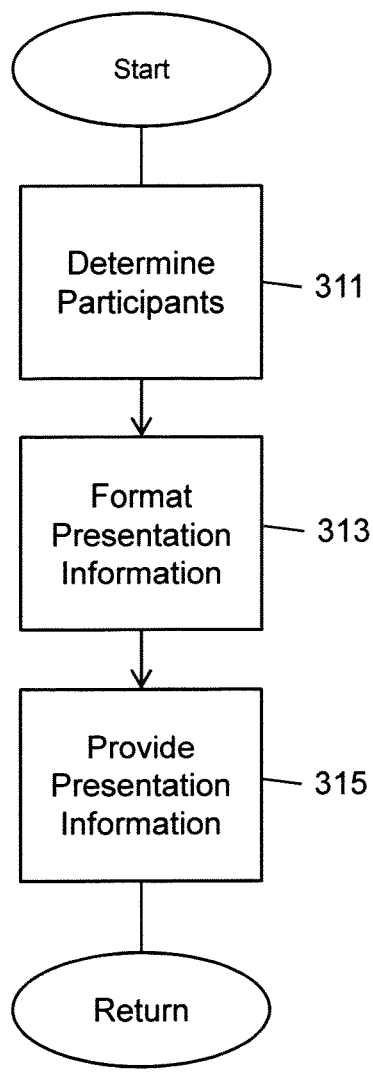
FIG. 3 is a flow diagram of a process for providing presentation information in accordance with aspects of the invention.

FIG. 3 is a flow diagram of a process for providing presentation information in accordance with aspects of the invention. The process may be performed, for example by the server of FIG. 2. In block 311 the process determines participants in a conversation. The process may determine participants in a conversation by receiving an indication that a user desires to be involved in the conversation. In some embodiments only users who have been invited to participate are allowed to participate. In some embodiments the first M users who request to participate are allowed to participate, with M being a predetermined maximum number of participants. In block 313 the process determines format of presentation information. The format of the presentation information may depend, for example, on the number of participants, whether or not participants may communicate only by way of audio or also by way of text, or other factors. In some embodiments the presentation information is formatted to appear as shown in FIG. 1, or to include portions of what is shown in FIG. 1. In some embodiments each participant is provided a display box or window, and a request to participate from a user may include an indication of a display box desired by that user. In block 315, the process provides presentation information. The presentation information in most embodiments includes a video display of participants and audio and/or textual information from the participants. For example, the process may receive video data, audio data, and/or text data from participants, and provide the data as part of the presentation information. In addition, in some embodiments the presentation information includes, on a participant-by-participant basis, a uniform resource locator (URL) or other link, indicator, or pointer which may be used by viewers or participants to obtain additional information about the participants.

Figure 4:
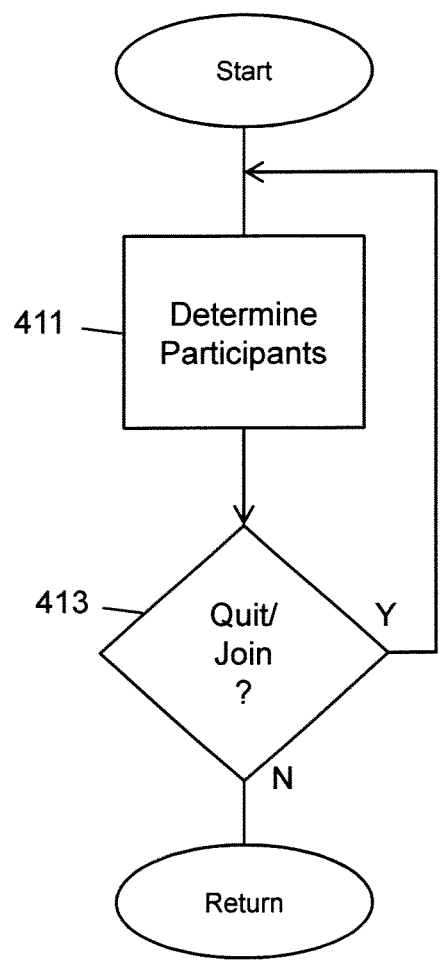
FIG. 4 is a flow diagram of a process for determining participants in a conversation in accordance with aspects of the invention.

FIG. 4 illustrates a flow diagram of a process for determining participants in a conversation. In block 411 of the process determines participants. In block 413 in the process determines if an existing participant desires to quit the conversation, or if a user desires to join the conversation. If so, the process returns to block 411, and re-determines the participants in the conversation. This redetermination may include removing the participant from the conversation if the participant desires to quit the conversation. The redetermination may also include determining if a user is allowed to participate in the conversation. For example, in some embodiments only registered users may be allowed to participate, in other embodiments only invited participants may be allowed to participate, and in various other embodiments participants may only be allowed to participate if information of the user meets a predetermined criteria. For example, the predetermined criteria may specify allowable age ranges, or other personal characteristics for participants.

Figure 5:
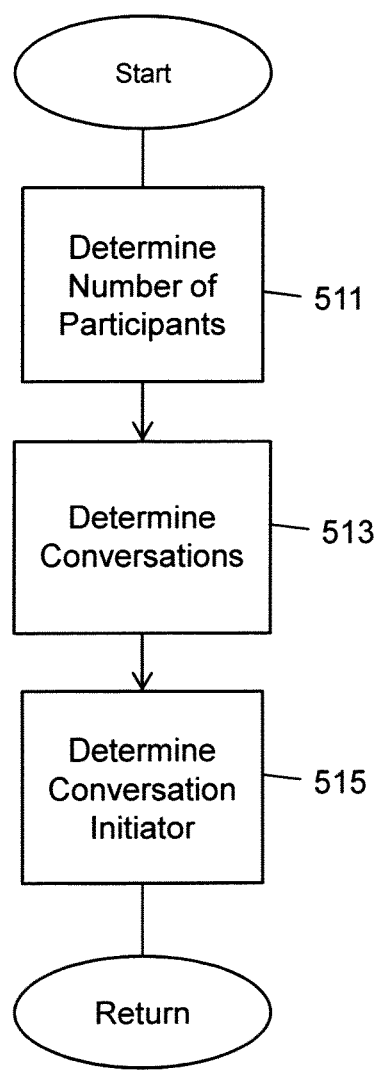
FIG. 5 is a flow diagram of a process for determining presentation layout information in accordance with aspects of the invention.

FIG. 5 is a flow diagram of the process for determining the format for presentation information for conversations. In block 511 the process determines the number of participants participating in the conversation. For example, the number of participants may determine the number of participant boxes to be displayed, the relative arrangement of participant boxes, and the size and other characteristics of the participant boxes. In block 513 the process determines information regarding conversations between participants. For example, the process may map video from a particular participant to a particular participant box, and identify audio to be transmitted with a particular participant. In block 515 process determines who is a conversation initiator, for example for purposes of determining location of presentation of text boxes. The process thereafter returns.

In some embodiments participants may be playing a game, and the conversation may effectively be the game, or statements of participants while playing the game. For example, the game may be a contest in which participants answer questions regarding various topics, which may be in preselected fields. For example, the contest may test the participants' knowledge regarding sports, television, popular culture, or other areas. In addition, in some embodiments in the participants may also be allowed to attempt to entertain users who may be viewing the participants. In some such embodiments of the participants may be judged both on their knowledge of the field which is topic of conversation, for example by measuring the number of correct answers participants may have, as well as being judged by viewers as to an entertainment value provided by the participants.

Figure 6:
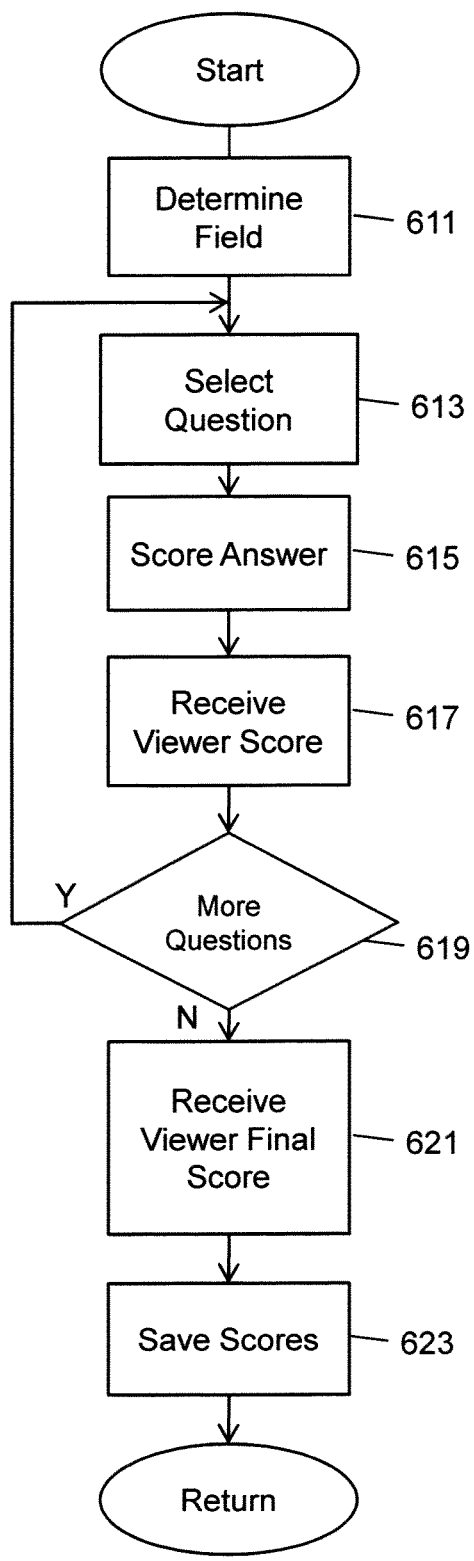
FIG. 6 is a flow diagram of a process for providing a scored conversation in accordance with aspects of the invention.

FIG. 6 is a flow diagram of a process providing for presentation of a conversation in the form of a scored game in accordance with aspects of the invention. In block 611 the process determines the field or topic of the conversation. The field or the topic of the conversation may be, for example television trivia. In block 613 the process selects a question relating to the field. In some embodiments a database of questions, sorted by fields, is maintained, and the process selects questions from the database. In some embodiments the questions are selected by a computer, which may then announce the question to the participants, either by way of a text-to-speech program or by way of a prerecorded voice presenting the question. In some embodiments viewers may submit questions, for example electronically over a communications network, with the process selecting a viewer submitted question. In some embodiments the process may display text of questions to participants, participants may indicate which questions they wish to answer, and the process may select those questions.

In block 615 the process scores answers received from a participant. The score of the answer may be simply a zero if the participant answered the question incorrectly, or a one if the participant answered question correctly. In various embodiments questions may also the weigh the answer in terms of difficulty of the question, with correct answers to more difficult questions provided higher scores. In some embodiments the score of the answer may depend on a length of time taken by a participant to answer a question, with for example answers provided in shorter amounts of time provided higher scores. Further, in some embodiments multiple participants may each answer a particular question, and participants who answer the question in shorter times than other participants receiving higher scores than the other participants.

In block 617 the process receives a viewer score for the participant answering the question. In some embodiments the viewers may determine or decide if the participant answered the question correctly. In many embodiments, however, the viewers score not the correctness of the participant's answer, but instead the entertainment value the participant provided in answering the question.

In block 619 the process determines if more questions should be asked. If so the process returns to block 613 and asks the participants additional questions. Otherwise, the process proceeds to block 621 and receives a viewer final score. The viewer final score may indicate the overall level of entertainment value that a participant provided. In block 623 the process saves the scores, generally on a participant by participant basis. The process thereafter returns.

Figure 7:
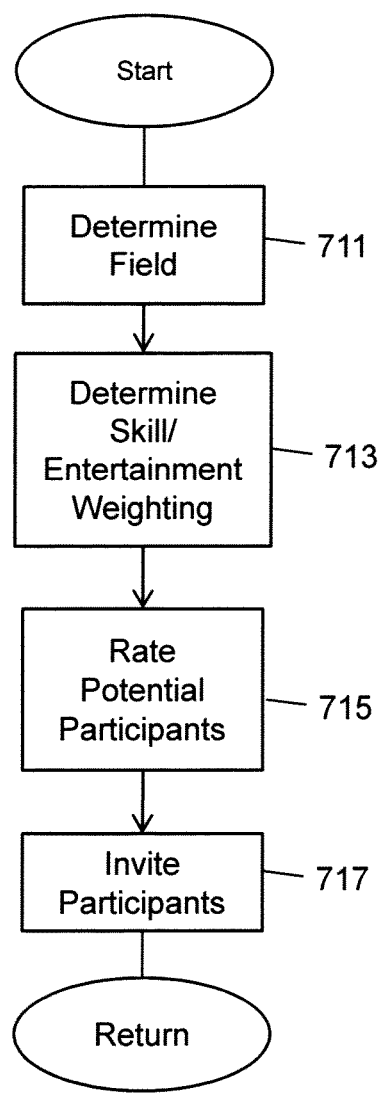
FIG. 7 is a flow diagram of a process for determining participants to be invited to participate in a conversation in accordance with aspects of the invention.

FIG. 7 is a flow diagram of a process for determining participants to invite to a conversation. In block 711 the processed determines a topic of the conversation. In block 713 the process determines the skill and entertainment weighting to be applied. For example, in some conversations entertainment value is not desired, but instead a skill of the participant in answering questions is greatly desired. In such a case, the skill rating of potential participants is more heavily weighted. In other conversations, entertainment value of the participants is more greatly desired, and the particular skill of the participant is of less importance.

In block 715 the process grades potential participants. The rating of the potential participants is based on the skill scores of potential participants and the entertainment scores of the potential participants is weighed as desired. In block 717 the process invites participants to engage in a conversation. In some embodiments the highest rated participants are invited prior to the lower rated participants. The process thereafter returns.

Although the invention has been described with respect to various embodiments, it should be recognized that the invention comprises the novel and non-obvious claims, and their insubstantial variations, supported by this disclosure.

The invention claimed is:

1. A method using a server of providing for presentation of a game, comprising:
    transmitting, by the server, at least one question over a network to a plurality of participants and a plurality of viewers;
    receiving, by the server, audio data and video data over the network from the plurality of participants, the audio and video data including a response to the at least one question from at least one participant;
    transmitting, by the server, the audio data and video data and, for each participant, a uniform resource locator (URL) indicating a source of additional information regarding each participant, over the network to the plurality of viewers;
    scoring, by the server, the response to the at least one question from the at least one participant; and
    receiving, by the server, over the network a score indicative of entertainment value of the at least one participant from at least some of the plurality of viewers;
    wherein scoring the response to the at least one question from the at least one participant comprises determining if the response the at least one question matches a predetermined response and providing a positive score to the at least one participant if the response matches the predetermined response;
    wherein the positive score is weighted by a predetermined difficulty of the at least one question; and
    further comprising iteratively:
        transmitting a further question over the network to the plurality of participants and the plurality of viewers, the further question being a different question each iteration;
        receiving further audio data and video data over the network from the plurality of participants, the further audio and video data including a response to the further question from at least one participant responding to the further question;
        transmitting the further audio data and video data over the network to the plurality of viewers;
        scoring the response to the further question from the at least one participant responding to the further question; and
        receiving over the network a score indicative of entertainment value of the at least one participant responding to the further question from at least some of the plurality of viewers; and
    further comprising saving in memory scores of the participants; and
    further comprising selecting further participants for a further game based on scores saved in memory of the further participants from past games; and
    further comprising receiving a skill/entertainment weighting for the further game;
    wherein selecting further participants for a further game based on scores saved in memory of the further participants from past games comprises selecting those further participants who have the highest scores after applying the skill/entertainment weighting.

2. The method of claim 1 wherein the positive score is weighted by an length of time taken by the at least one participant to answer the question.

* * * * *